United States Patent
Hargraves et al.

(10) Patent No.: US 6,950,987 B1
(45) Date of Patent: Sep. 27, 2005

(54) REMOTE DOCUMENT MANAGEMENT SYSTEM

(75) Inventors: Edward Ray Hargraves, Houston, TX (US); Mark Sang Cho, Houston, TX (US); Saqib Kasim, Sugarland, TX (US); Alexander Kouznetsov, Katy, TX (US); Heli Zhu Zahn, Katy, TX (US)

(73) Assignee: SimDesk Technologies, Inc., Houston, TX (US)

( * ) Notice: Subject to any disclaimer, the term of this patent is extended or adjusted under 35 U.S.C. 154(b) by 273 days.

(21) Appl. No.: 10/142,197

(22) Filed: May 9, 2002

Related U.S. Application Data

(60) Provisional application No. 60/289,814, filed on May 9, 2001.

(51) Int. Cl.[7] .......................... G06F 17/24; G06F 17/30
(52) U.S. Cl. ...................... 715/523; 707/10; 709/217; 715/530
(58) Field of Search .................. 707/10, 201; 709/201, 709/217, 218; 715/522, 523, 530

(56) References Cited

U.S. PATENT DOCUMENTS

| | | | |
|---|---|---|---|
| 5,956,681 A * | 9/1999 | Yamakita | 704/260 |
| 5,996,010 A | 11/1999 | Leong et al. | 709/223 |
| 6,014,668 A | 1/2000 | Tabata et al. | 707/10 |
| 6,105,042 A | 8/2000 | Aganovic et al. | 707/500 |
| 6,151,507 A * | 11/2000 | Laiho et al. | 455/466 |
| 6,289,460 B1 | 9/2001 | Hajmiragha | 713/200 |
| 6,321,991 B1 | 11/2001 | Knowles | 235/472.01 |
| 6,487,597 B1 * | 11/2002 | Horie et al. | 709/227 |
| 6,615,213 B1 * | 9/2003 | Johnson | 707/10 |
| 6,704,770 B1 * | 3/2004 | Ramakesavan | 709/205 |
| 2001/0034845 A1 | 10/2001 | Brunt et al. | 713/201 |
| 2002/0046268 A1 | 4/2002 | Leong et al. | 709/223 |
| 2002/0083236 A1 * | 6/2002 | Wang | 710/62 |
| 2002/0124019 A1 * | 9/2002 | Proulx et al. | 707/513 |

FOREIGN PATENT DOCUMENTS

| | | | |
|---|---|---|---|
| EP | 433073 A2 * | 6/1991 | G06F 15/20 |

* cited by examiner

Primary Examiner—Jack M. Choules
(74) Attorney, Agent, or Firm—Woodard, Emhardt, Moriarty, McNett & Henry LLP

(57) ABSTRACT

A remote document editing system and method are disclosed that permit users of wireless devices having limited capabilities to remotely edit and manage documents located and stored on a central or network server. The document to be edited is separated into text and format components or segments and only the text segment is typically sent or transmitted to the remote device. After editing or review of the document text is complete, the text segment is returned to the network server, where it is recombined with the format segment to reconstruct a new document having edited text but formatting unchanged from the original document.

11 Claims, 4 Drawing Sheets

REMOTE DOCUMENT MANAGEMENT SYSTEM

REFERENCE TO RELATED APPLICATIONS

This application claims priority from a Provisional Application Ser. No. 60/289,814, filed May 9, 2001, which is hereby incorporated by reference.

BACKGROUND OF THE INVENTION

The present invention relates to a system for remote editing of documents, and in particular, to the editing of documents by remote devices having limited processing, input/output, storage, and/or network transmission capabilities.

Today's business environment often requires the need for reviewing and editing documents from remote locations. Although laptop computers are often used for such activities, developing technology now allows the users of wireless devices such as person digital assistants (PDAs) or internet cellular phones to access their company's computer network to send and receive information. It is often desirable to be able to access documents stored on a central computer or within the accessed network for review and/or minor editing, such as updating a trip report or correcting a document based on newly learned information. PDAs and internet phones limited capabilities, such as in the bandwidth through which they can send and receive information, the amount of memory available to store received information and documents, the features available for user input, and the size and type of display which constrains the appearance of a remotely accessed document. Lengthy or heavily formatted documents may require an extended time to transfer to a remote wireless device, or may exceed the memory capacity of the device. The technology incorporated in such devices also may limit the amount or complexity of document formatting that can be displayed. It may not be possible, therefore, for users to access the documents they wish to view or edit.

Existing methods of remote document management or editing typically involve the use of higher-bandwidth- or higher-memory-based equipment, such as laptop computers, or computers connected via telephone lines or other wired technology, where device capabilities are not as constrained as they are in the case of wireless devices such as PDAs and internet-capable cellular phones.

U.S. Pat. No. 6,105,042 to Aganovic et al. (issued Aug. 15, 2000) discloses a computer network that adjusts the resolution of graphic information sent to a remote user in accordance with the display capabilities of the user's equipment. The problems associated with low-bandwidth transmission channels, or with remote devices having memory- or size-limited displays are not addressed.

U.S. Pat. No. 5,996,010 (issued Nov. 30, 1999) describes a network with web-enabled remote devices in which the network server propagates information to a remote device in a particular format (e.g., HTML) that can be understood and displayed by the remote device. Transmission bandwidth and the nature of the display device are not addressed.

SUMMARY OF THE INVENTION

It is therefore an object of the present invention to provide a system for access by remote wireless devices in which documents are propagated and transmitted to the remote device in a form that permits efficient editing of the document without transmitting unnecessary or unusable information.

It is a further object of the present invention to provide a document editing system that accommodates a variety of different remote devices having different display, editing and other capabilities.

It is a further object of the present invention to provide a document editing system that preserves document formatting independent of the editing device while permitting changing of text.

It is another object of the present invention to provide a document management system that comprises a processor for modifying a stored document in accordance with attributes of a remote wireless device. The modified document is transmitted to the remote device for editing consistent with the remote device capabilities.

It is yet another object of the present invention to provide a method for remote editing of documents in which a formatted document is modified to separate the format information from the text information. The text information is transmitted to a remote wireless device according to the remote device's capabilities, where it is edited and returned for recombination with the saved formatting information.

These and other objects of the present invention will become apparent from the following description, with reference to the drawings.

DESCRIPTION OF THE EMBODIMENTS

Figure 1:
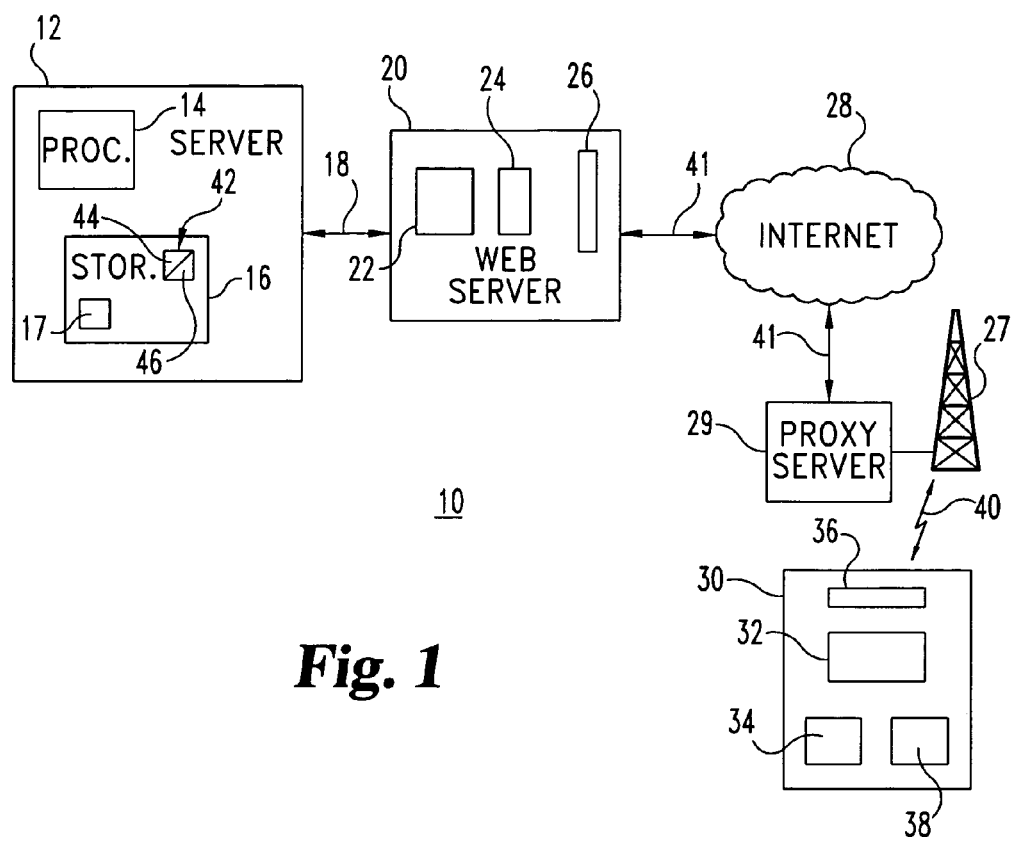
FIG. 1 is a block diagram of a computer network in accordance with the present invention.

Referring to FIG. 1, there is shown a computer network 10 that includes a server 12. In accordance with an aspect of the present invention, server 12 operates as a document server. Server 12 incorporates the functionality of a processor 14 and electronic storage 16. Electronic storage 16 may comprise any of a variety of memory media, including, without limitation, various forms of random access memory (e.g., RAM, SRAM, DRAM), a hard disc drive, or removable memory, such as floppy discs or magnetic tape. A document 17 is shown illustratively stored in electronic storage 16. Server 12 may also include other components that are typically found in network servers, but are not specifically identified here.

Operably connected to server 12 via communications channel 18 is a web server 20. Web server 20 incorporates the functionality of a processor 22, network interface cards 24 and a firewall 26. Web server 20 operates to provide connection to network 10 for one or more remote devices via the internet. In FIG. 1, the internet is shown as zone 28 and the remote devices are illustratively shown as a single representative remote device 30. Remote device 30 is shown to be an internet-capable wireless device, such as a wireless personal digital assistant (PDA), which are sold under various brands, including PALM, or an internet-capable cellular telephone. Remote device 30 includes a display 32, a processor 34, a communications module 36 (which may comprise hardware and/or software), and electronic storage 38. Electronic storage 38 may also be of conventional type, including hardwired memory such as RAM, or removable memory, such as, for example, a flash memory card. Remote device 30 is operatively connected to web server 20 through wireless communications channel 40, to cellular phone tower 27, and via internet zone 28 by way of cellular system proxy server 29. The internet connection from proxy server 29 to web server 20 is by conventional means, which may include land lines 41.

In accordance with an aspect of the present invention, remote device 30 utilizes communications module 36 to establish a communications link with web server 20 via internet zone 28 over wireless communications channel 40. Firewall 26 of web server 20 provides security for network 10 through various means, including password protection. Communications between web server 20 and remote device 30 may be encrypted if desired and such capability is implemented within network 10. For illustrative purposes, remote device makes a request to web server 20 that the user of remote device 30 wishes to view and possibly edit document 17 which is stored in electronic storage 16 of server 12. Web server 20 communicates this request to server 12, and also communicates the type or identity (e.g., PDA, internet phone) of remote device 30 to server 12. Identification of remote device 30 may be by way of identification information, such as browser version of remote device 30, communicated in the request message from remote device 30, or may be by the identification of a particular web server accessed by remote device 30 through its selected or chosen URL.

For illustrative purposes in describing the present invention, document 17 exists as a lengthy document with complex formatting. Remote device 30 does not have the capability to receive and display document 17 directly. The document 17 file size may be too large to fit within electronic storage 38, the capability of communications module 36 and processor 34 may not permit efficient transfer of the document 17 file in a timely manner, the display 32 of remote device 30 may not be large or sophisticated enough to accurately display document 17, or some other problem or deficiency may exist. In most instances in which a user desires to view or edit a document via a wireless device, however, the user is not necessarily concerned about the overall appearance of the document, but is merely interested in reviewing or editing the text. This is particularly true in the case of PDAs and internet-capable phones, which possess less data processing power than laptop computers, for example.

In accordance with the present invention, server 12 processes the request for document 17 from remote device 30 as follows. Document 17 is first converted into a rich text format (i.e., ".RTF") document, if it does not already exist in electronic storage 16 in such form. In the preferred embodiment, RTF form is used to permit the associated document to be reproduced as ASCII characters, but other suitable file formats may be used as well. Processor 14 then processes document 17 in RTF form to create a segmented structure document 42. Segmented document 42 illustratively exists in a preferred embodiment as an XML string and comprises two segments: a format segment 44 and a text segment 46. Format segment 44 includes the format information (e.g., paragraph identifiers, type fonts, page layout styles, etc.) and the identification information necessary to determine where each of the format items fits or occurs within original document 17. Text segment 46 contains the text portion of document 17, with identifying information that permits the user to determine what a particular portion of text represents in the original document (e.g., paragraph titles, paragraph markers, etc.). Format segment 44 and text segment 46 are broken into small blocks of data, with each block having an assigned segment number for location identification purposes.

Depending upon how memory is to be utilized (e.g., memory size vs. response speed), server 12 may maintain format segment 44 in memory, associated with segmented document 42 and text segment 46, or server 12 may recreate format segment 44 whenever a new request or communication regarding the document is received from remote device 30. Text segment 46 may be sent to remote device 30 via the same communications network used by remote device 30 to contact server 12 to request document 17. The information used by web server or server 12 to identify remote device 30 also contains information that specifies the size of files that remote device 30 can display to the user via display 32. If, for example, the file size of a text segment 46 data block is larger than can be directly displayed by display 32, processor 14 of server 12 will break the text segment 46 block into smaller blocks, such that each transmitted block is small enough to be directly displayed by display 32 of remote device 30. For example, some internet-capable cellular phones use Wireless Application Protocol (WAP) web browsers made by Openwave Systems. Early version of the Openwave browsers have page size limitations of approximately 1.4 K bytes. Later versions expand the page size limitation to 2 K bytes. The browser version is communicated to server 12 by remote device 30 and processor 14 then processes text segment 46 data blocks appropriately to provide suitably-sized blocks of data for display purposes.

As each block of data from text segment 46 is displayed on display 32 of remote device 30, a user may choose to make changes or edits to the text. These changes are made using the normal text editing functionality that is provided with the particular device being used. As an example, PDAs have greater text editing functionality than internet phones. As the user completes editing of text segment 46 blocks, and the blocks have been transmitted back to server 12 via the communications network previously described, a complete edited text segment 46' is formed. In accordance with the present invention, processor 14 reassembles segmented structure document 42' by utilizing format segment 44 and edited text segment 46'. The reassembled segmented structure document 42' is then reconverted to an RTF document and saved in electronic storage 16.

In the previous description, and in accordance with the present invention, text editing capability is provided to remote users of devices having limited or constrained capabilities, including, but not limited to low-bandwidth, limited memory or the size of their associated display devices. Formatting information is saved so that text editing may be made without disturbing the underlying formatting of the original document. Text data is provided to the remote user in a form that is best suited for display and editing on the particular device being used.

Figure 2:
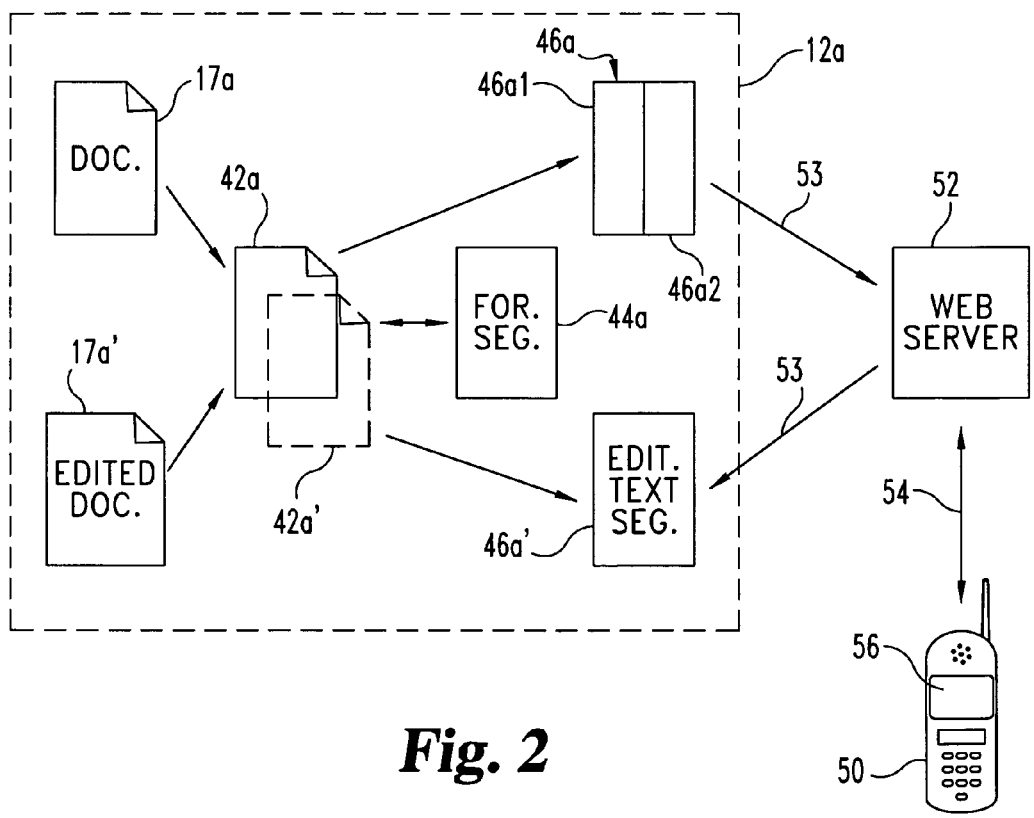
FIG. 2 is a diagram showing the paths of information flow in one embodiment of the present invention.

FIG. 2 illustrates the information construction flow in connection with a request to transfer a representative document 17*a* to a remote device illustrated in FIG. 2 as an internet phone 50 using Wireless Application Protocol (WAP) technology. For simplicity in illustration, WAP phone 50 is shown being directly connected to server 12a via a web server 52 through communications channel 54, although the actual manner of connection may be as that described above, which utilizes a cellular telephone system, a cellular system proxy server, and the internet. Web server 52 is operably connected to server 12a via links 53 which may, for example, be hardwired or network-based connections.

Document 17a is illustratively described as existing within server 12a as an RTF format document. In practice, document 17a may be saved as a Microsoft Word document, a Wordperfect document, or as another common format. Prior to processing in accordance with the invention, however, document 17a is converted to an RTF (ASCII character) document, or a new document is created from an existing other-format document in RTF form. Such conversion or creation may be done at the time the original document is created, or it may be done when a request arrives from a remote user for transfer or transmission of that particular document.

Figure 3:
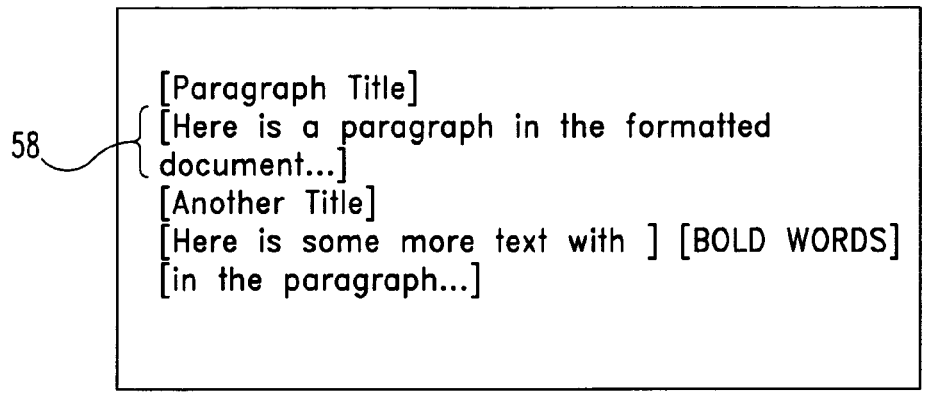
FIG. 3 is a representative screen display illustrating the embodiment shown in FIG. 2.

When such a request for document 17a is received by server 12a from WAP phone 50, server 12a, through its incorporated processor (not shown), creates segmented structure document 42a. Segmented structure document 42a is created in the preferred embodiment as an XML document, but other data string formats may also be suitable. Segmented structure document 42a is illustratively shown as forming format segment 44a and text segment 46a, each of which comprises a number of smaller data blocks with assigned location-identifying segment numbers. Format segment 44a may be maintained within the electronic storage of server 12a or it may be recreated when needed, such as when a new request from WAP phone 50 is received, depending upon how the memory of server 12a is utilized. Text segment 46a, or a copy thereof, is transferred or transmitted to WAP phone 50 through web server 52 via communications channel 54. The request for document 17a from WAP phone 50 also includes information that identifies the remote device as WAP phone 50, and also provides information concerning any file size limitations or other specific requirements of WAP phone 50. In the example of FIG. 2, the display 56 of WAP phone 50 is not large enough to display an entire data block of text segment 46a. The processor of server 12a, in response to this information, breaks text segment 46a blocks into smaller blocks, illustrated as blocks 46a1 and 46a2. Blocks 46a1 and 46a2 are then individually transferred to WAP phone 50 and individually displayed on display 56 of WAP phone 50. FIG. 3 shows an illustrative portion of the display of a block of text as separate HTML links derived from text segment 46a. If the user of WAP phone 50 desires to edit the displayed text information, he or she selects the particular HTML link that is desired to be edited, such as link 58 in FIG. 3. Web server 52 then returns the selected information representing link 58 to the user as an editable text block. The user edits the text block using the editing functions (cursor, character select, character change) provided through WAP phone 50. Once the editing is completed, the edited information is transferred back to server 12a via web server 52, communications channel 54 and links 53 as an edited text segment 46a'. Server 12a then combines unmodified format segment 44a with edited or updated text segment 46a' to create an updated segmented structure document 42a' that is then reconverted in an edited or updated RTF document 17a'. New paragraphs created by the user are formatted using the same formatting structure as was included in the preceding document paragraph.

Figure 4:
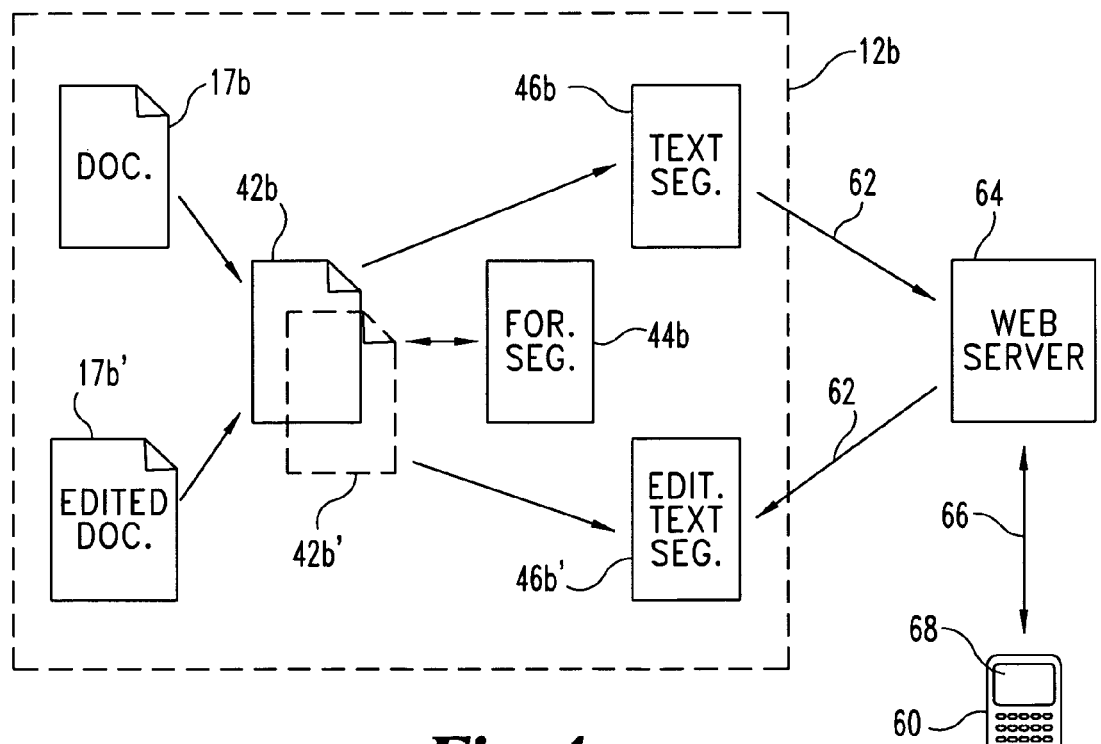
FIG. 4 is a diagram showing the paths of information flow in another embodiment of the present invention.

FIG. 4 illustrates, similar to FIG. 2, the information construction flow associated with the editing of a document by a PDA 60. PDA 60 requests that a representative document 17b be made available for viewing and possible editing. In a manner similar to that described in connection with FIG. 2, server 12b causes the creation of segmented structure document 42b from RTF document 17b. As described above, document 17b may be stored in server 12b in any number of word processor or other file formats, but prior to the creation of segmented structure 42b, document 17b must be converted to an RTF format document, if it does not already exists as one.

Segmented structure document 42b forms format segment 44b and text segment 46b comprising individually numbered data blocks. As in the example described in connection with FIG. 2, format segment 44b remains associated with server 12b, while text segment 46b, or a representation or copy thereof, is sent to PDA 60. Text segment 46b is sent to PDA 60 through communications channels or links 62, web server 64, and communications channel 66. Communications channel 66 is shown in simplified form, but as in the example of FIG. 2, it also includes a cellular telephone system and associated tower and equipment, and the internet.

If necessary due to page size limitations of PDA 60, the data blocks of text segment 46b may be required to be broken down into smaller blocks of data before transmission to PDA 60, as described above with respect to WAP phone 50, although PDAs will typically have greater capacity and larger page size limits than internet telephones. In the example of FIG. 4, the blocks of text segment 46b are shown being directly transmitted without the requiring the creation of smaller data blocks.

Figure 5:
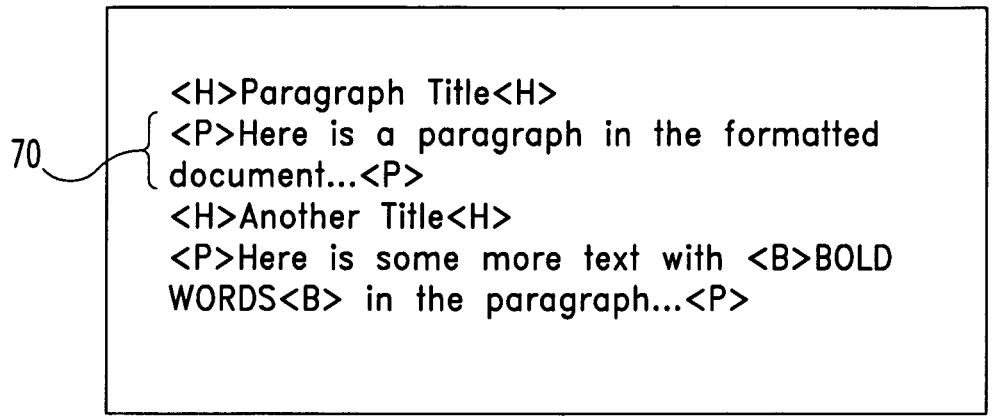
FIG. 5 is a representative screen display illustrating the embodiment shown in FIG. 4.

FIG. 5 illustrates the appearance of a representative section of text that may appear on display 68 of PDA 60. The use of any particular set of tags or identification symbols is not important, and will be determined by the particular application that is implemented or being run. The user of PDA 60 may, if desired, choose a portion 70 of text to edit by using the normal text creation and editing tools provided with that particular PDA. As the user completes the desired editing process, data blocks of edited text segment 46b' are returned or retransmitted back to server 12b. Edited or changed text segment 46b' is then combined with format segment 44b to form a reconstructed segmented structure document 42b', from which a new formatted RTF document 17b' is formed, having new or edited text but the original formatting of document 17b.

Figure 6:
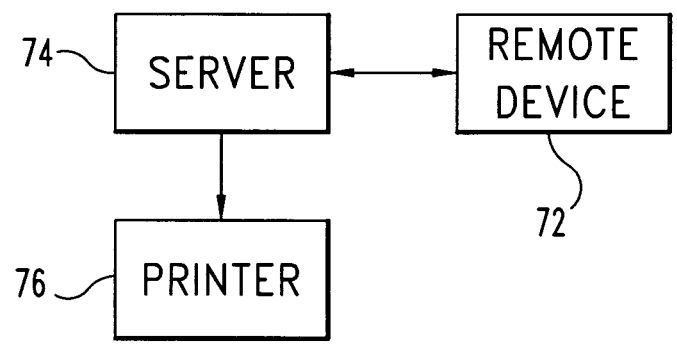
FIG. 6 is a block diagram illustrating a feature of the present invention.

FIG. 6 illustrates an additional feature available to a user of a remote device. As described in co-pending application Ser. No. 10/010,303, owned by the same entity as the present application, a remote device 72, which may illustratively be a PDA or an internet phone, may also request document server 74 to print a stored document at printer 76. A user of a remote device may therefore edit a document in accordance with the present invention as described and explainer herein, and further cause such edited document to be printed at a site remote from the user.

Figure 7:
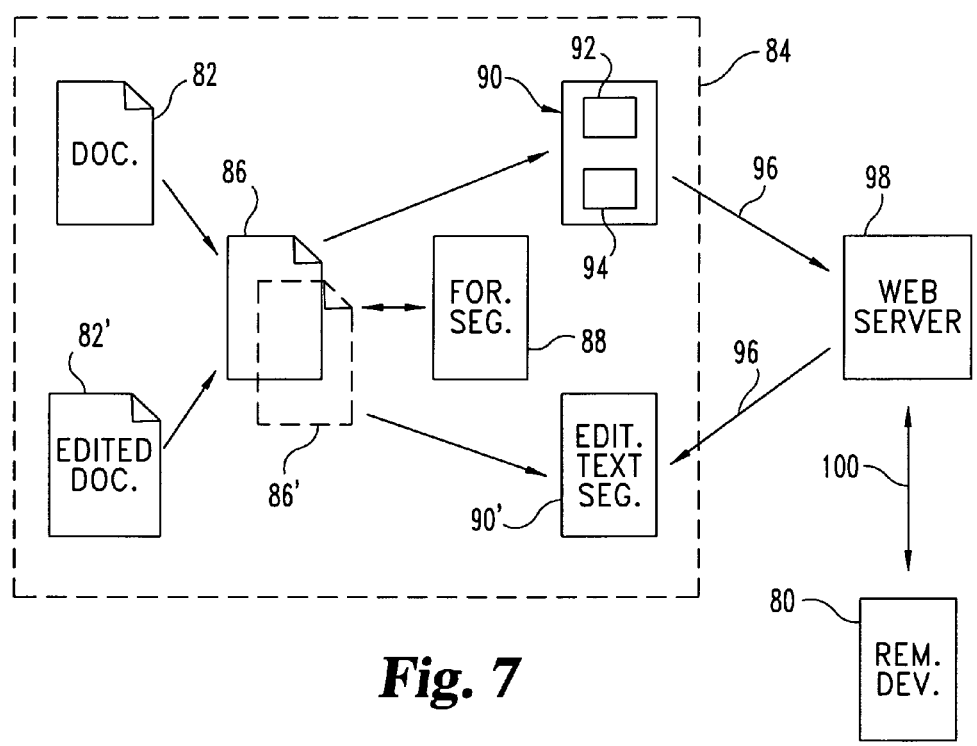
FIG. 7 is a diagram showing the paths of information flow in a further embodiment of the present invention.

FIG. 7 shows a further embodiment of the present invention in which a remote device 80, such as a wireless PDA or internet phone, may also perform some limited format editing as well as the text editing previously described. In the example of FIG. 7, remote device 80 requests a document 82 for editing from server 84. Server 84, in accordance with the invention, converts document 82 into an RTF (or other suitable format) document, if it does not already exist as one. RTF format document 82 is then processed to create a segmented structure document 86. Segmented structure document 86 forms a format segment 88 and a text and modified format segment 90. Segment 90 includes the text information 92 of document 82, as well as format information 94. Typically, the amount of format information 94 included in segment 90 will be less than the total format information from document 82, as represented by format segment 88. The amount of format information 94 provided to a user may be determined based on the degree of format changes that are allowed (which may vary or change depending upon the overall completeness or complexity of document 82), or the limitations or capabilities of remote device 80 to perform format editing. As in the previously described examples, the data blocks of segment 90 are sent or transferred to remote device 80 via communications links 96, web server 98, and communications channel 100 (which, as also previously described, includes cellular telephone equipment and the internet).

The user of remote device 80 then proceeds to view and possibly edit the text and document format information of segment 90 data blocks. Once editing is complete, the blocks of segment 90 are sent back to server 84 to form edited segment 90'. Segment 90' is then combined with format segment 88 to form a new segmented structure document 86', which is reconverted to a new RTF document 82' having text and format changes compared to original document 82.

While the present invention has been illustrated in the drawing and described in detail in the foregoing description, it is understood that such illustration and description are illustrative in nature and are not to be considered restrictive, it being understood that only the preferred embodiments have been shown and described and that all changes and modifications that would be apparent or would occur to one skilled in the art are to be protected.

What is claimed is:

1. A document management system comprising:
   a document storage and processing device;
   at least one document associated with said document storage and processing device, said document having a set of attributes of a first complexity level;
   a remote device capable of editing documents having a set of attributes of a second complexity level, said second complexity level being less than said first complexity level;
   a communications signal associated with said remote device for transmitting information of said set of attributes of said second complexity level to said document storage and processing device;
   said document storage and processing device being responsive to said communication signal for creating a representation of said document having a set of attributes of said second complexity level; and
   means for transmitting said representation of said document to said remote device for creating a first edited document by said remote device, and for transmitting said first edited document back to said document storage and processing device for using said first edited document to form a second edited document having a set of attributes of said first complexity level.

2. The document management system described in claim 1, wherein said remote device comprises a wireless personal digital assistant.

3. The document management system described in claim 1, wherein said remote device comprises an internet-capable cellular telephone.

4. The document management system described in claim 1, wherein said set of attributes is particular to the type of remote device.

5. The document management system described in claim 1, wherein said representation of said document contains text information.

6. The document management system described in claim 1, wherein said representation of said document does not contain document more than a limited amount of format information.

7. A method for remote editing of documents comprising the steps of:
   processing a first formatted document by a processor to create a first subset of said document containing format information and a second subset of said document containing text information;
   transmitting the information of said second subset to a remote apparatus;
   editing said information of said second subset using said remote apparatus;
   transmitting said edited information of said second subset to said processor; and
   combining said first subset and said edited information of said second subset to form a second formatted document in which the formatting information is unchanged from said first formatted document.

8. A document editing system for use by a remote device comprising:
   means for processing a formatted document to separate formatting information from text information;
   means for storing said formatting information in association with said processing means;
   means for transmitting said text information to a remote device;
   means for editing said text information by said remote device;
   means for transmitting said edited text information to said processing means; and
   means for combining said formatting information with said edited text information to provide a formatted document having edited text.

9. The document editing system described in claim 8, wherein said means for transmission utilizes communications via the internet.

10. The document editing system described in claim 8, wherein said means for processing further comprises means to separate said formatting information from said text information includes limited format information with said text information.

11. A document editing system comprising:
   a document processor for storing at least one document having a first set of attributes;
   a remote device capable of editing documents in accordance with a second set of attributes;
   communications means associated with said remote device for providing information related to said second set attributes;
   said document processor responsive to said information for modifying said at least one document in accordance with said second set of attributes; and
   means operably coupled with said communications means for transmitting said modified document to said remote device for forming a first edited document and for transmitting said first edited document back to said document processor for using said first edited document to form a second edited document in accordance with said first set of attributes.

* * * * *